United States Patent [19]

Ito et al.

[11] Patent Number: 4,925,198
[45] Date of Patent: May 15, 1990

[54] SHIMMY DAMPING SYSTEM FOR STEERABLE VEHICLES

[75] Inventors: Toshiaki Ito; Kazuhiro Numano; Masami Suzuki, all of Iwata, Japan

[73] Assignee: Yamaha Hatsudoki Kabushiki Kaisha, Iwata, Japan

[21] Appl. No.: 406,187

[22] Filed: Sep. 11, 1989

Related U.S. Application Data

[63] Continuation of Ser. No. 183,602, Apr. 19, 1988, abandoned.

[30] Foreign Application Priority Data

Feb. 12, 1988 [JP] Japan .................................. 63-30554

[51] Int. Cl.$^5$ ............................................ B62K 21/08
[52] U.S. Cl. ..................................... 280/89; 280/272; 280/758; 280/152.1; 180/219; 188/380
[58] Field of Search ............... 280/757, 758, 759, 772, 280/270, 271, 272, 89, 90, 108, 152.1, 152.3; 180/219; 188/378, 380, 311, 321.11; 293/104, 105

[56] References Cited

U.S. PATENT DOCUMENTS

| | | | |
|---|---|---|---|
| 1,783,348 | 12/1930 | Taylor | 280/758 X |
| 1,867,708 | 7/1932 | Paton | 293/104 |
| 2,137,947 | 11/1938 | Moore | 280/772 X |
| 2,797,931 | 7/1957 | Hans | 280/758 |
| 2,854,100 | 9/1958 | Bowser et al. | 280/758 X |
| 3,409,310 | 11/1968 | Hayner | 280/758 |
| 3,501,167 | 3/1970 | Palowsky | 280/758 |
| 4,588,206 | 5/1986 | Powers | 280/758 |
| 4,773,514 | 9/1988 | Gustafsson | 280/272 X |
| 4,811,807 | 3/1989 | Schier | 180/219 X |

FOREIGN PATENT DOCUMENTS

| | | | |
|---|---|---|---|
| 2710651 | 9/1978 | Fed. Rep. of Germany | 280/272 |
| 1000358 | 2/1952 | France | 280/758 |

*Primary Examiner*—Charles A. Marmor
*Assistant Examiner*—Brian L. Johnson
*Attorney, Agent, or Firm*—Ernest A. Beutler

[57] ABSTRACT

Several embodiments of shimmy damper arrangements for motorcycles wherein an inertial member is coupled to the front wheel by a suspension arrangement that permits the inertial member to move relative to the front wheel for dampening shimmy forces.

4 Claims, 6 Drawing Sheets

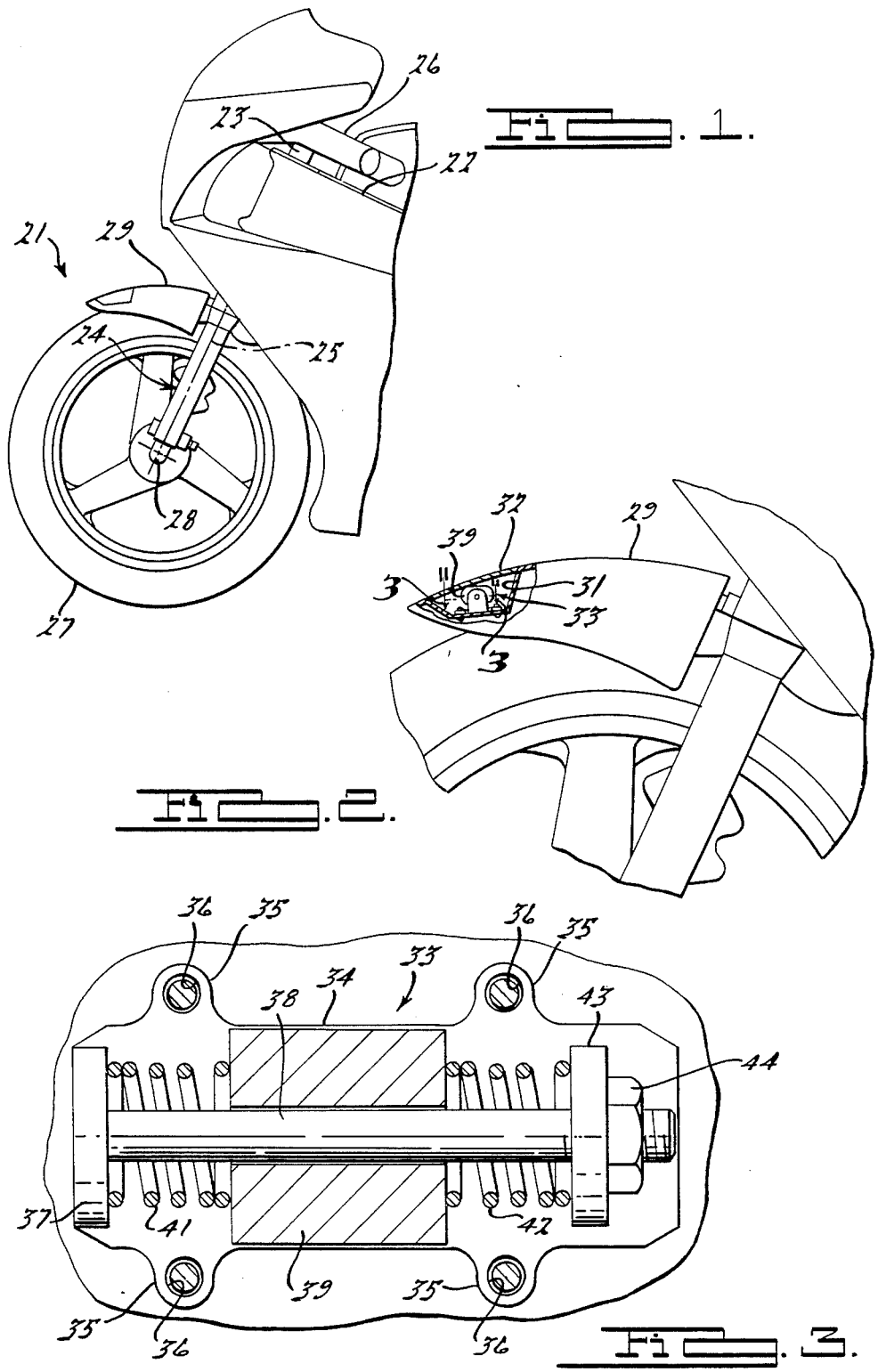

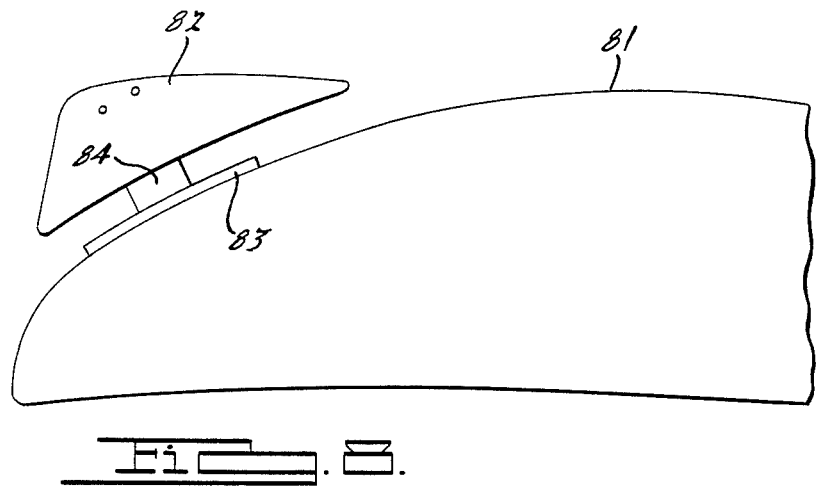
FIG. 8.
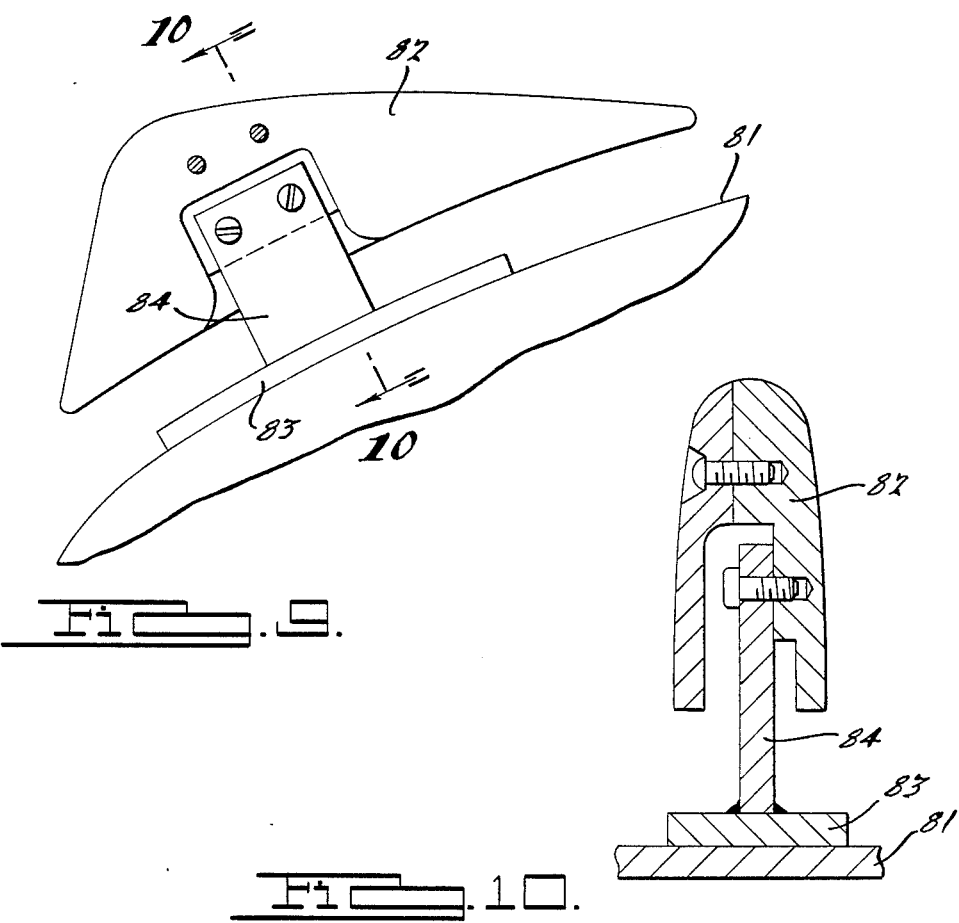
FIG. 9.
FIG. 10.

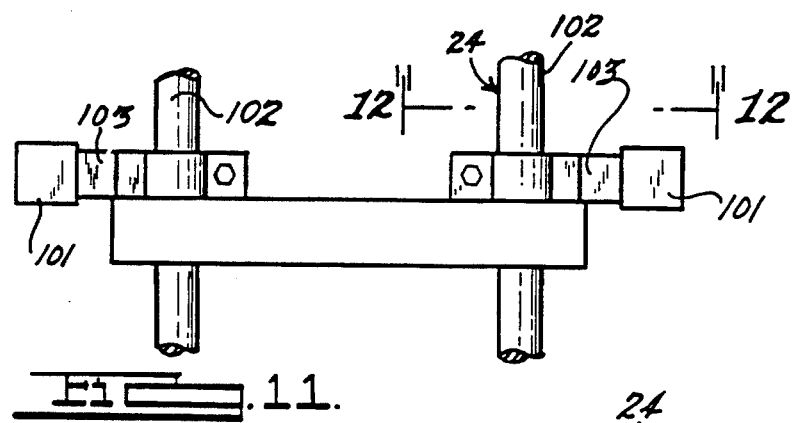
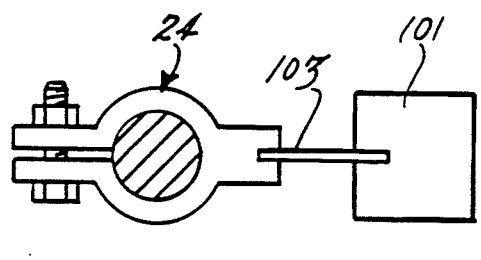
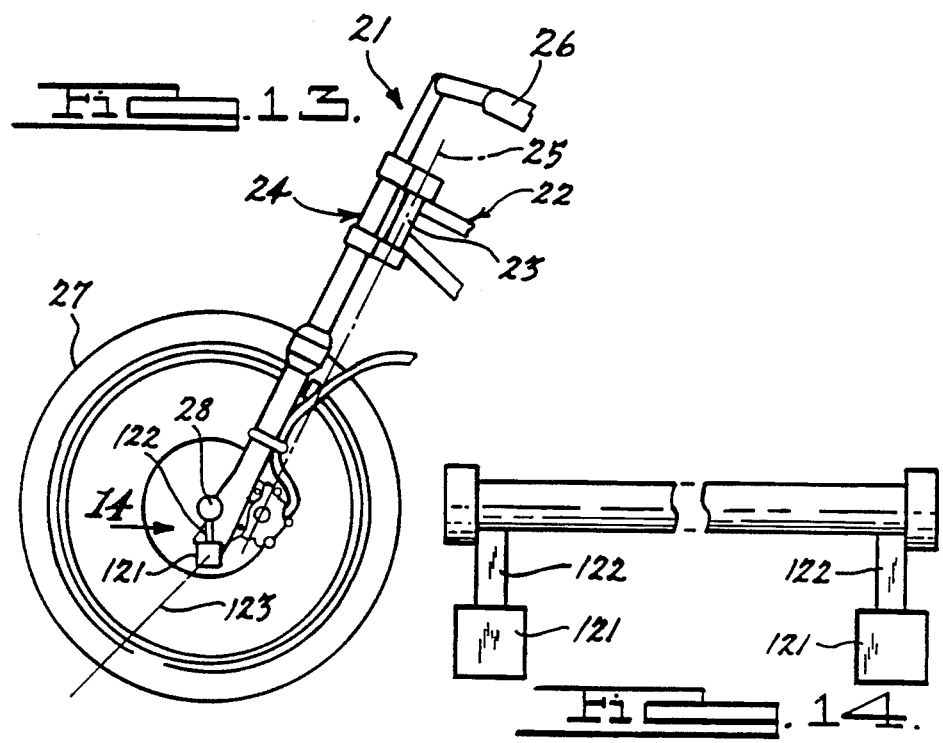

SHIMMY DAMPING SYSTEM FOR STEERABLE VEHICLES

This is a continuation of U.S. patent application Ser. No. 183,602 filed Apr. 19, 1988 now abandoned.

BACKGROUND OF THE INVENTION

This invention relates to a motorcycle steering system and more particularly to an improved system for steering of motorcycles.

In connection with the design, development and manufacturing of motorcycles, a motorcycle manufacturer spends a great amount of time and expense in tuning the steering system of the motorcycle to avoid a condition known as "shimmy." Shimmy is a condition wherein the steered wheel tends to oscillate about its steering axis due to a wide variety of factors, many of which are not fully understood and can be avoided only through substantial empirical testing. Although the motorcycle manufacturer will spend considerable effort in insuring that the motorcylce steering system is tuned so as to avoid shimmy under a wide variety of conditions, once the motorcycle reaches the hands of an ultimate rider, as riders known, various factors can arise which will cause the most highly tuned and best designed motorcycle steering system to exhibit shimmy.

As noted above, the factors which contribute to this effect are not fully understood and various things done by a rider may induce shimmy in the motorcycle steered wheel in spite of the best efforts of the manufacturer to avoid this situation. It is suspected that shimmy can be induced by a variety of factors in the hands of the consumer such as individual riding patterns, user modification of the motorcycle and alteration of its existing components and other factors which are beyond the manufacturer's control and which riders have come to expect. As a result, the best tuned motorcycle system which does not exhibit any shimmy at the factory, may give rise to shimmy due to factors that are beyond the manufacturer's control.

It is, therefore, a principal object of this invention to provide an improved motorcycle steering system.

It is a further object of this invention to provide a motorcycle steering system in which the effects of shimmy may be reduced even in the event of unforeseen circumstances.

It is a further object of this invention to provide a motorcycle steering system wherein the steering system is provided with an arrangement for reducing the likelihood of shimmy occurring in the steering mechanism in response to a wide variety of unforeseen circumstances.

SUMMARY OF THE INVENTION

This invention is adapted to be embodied in a steering damping arrangement that comprises a wheel and means for supporting the wheel for steering movement about a steering axis. An inertial mass is coupled to the wheel for movement with the wheel about the steering axis and for limited movement relative to the wheel about the steering axis for damping shimmy forces.

BRIEF DESCRIPTION OF THE DRAWINGS

FIG. 1 is a side elevational view of a portion of a motorcycle constructed in accordance with an embodiment of the invention.

FIG. 2 is an enlarged side elevational view of a portion of the motorcycle shown in FIG. 1.

FIG. 3 is a cross-sectional view taken along the line 3—3 of FIG. 2.

FIG. 8 is a side elevational view, in part similar to FIG. 1, showing another embodiment of the invention.

FIG. 9 is an enlarged side elevational view, with a portion broken away, of the embodiment of FIG. 8.

FIG. 10 is a cross-sectional view taken along the line 10—10 of FIG. 9.

FIG. 11 is a front elevational view, in part similar to FIG. 7, showing another embodiment of the invention.

FIG. 12 is a cross-sectional view taken along the line 12—12 of FIG. 11.

FIG. 13 is a partial side elevational view, in part similar to FIG. 1, showing yet another embodiment of the invention.

FIG. 14 is an enlarged elevational view taken in the direction of arrow 14 of FIG. 13.

DETAILED DESCRIPTION OF THE PREFERRED EMBODIMENT OF THE INVENTION

Figure 4:
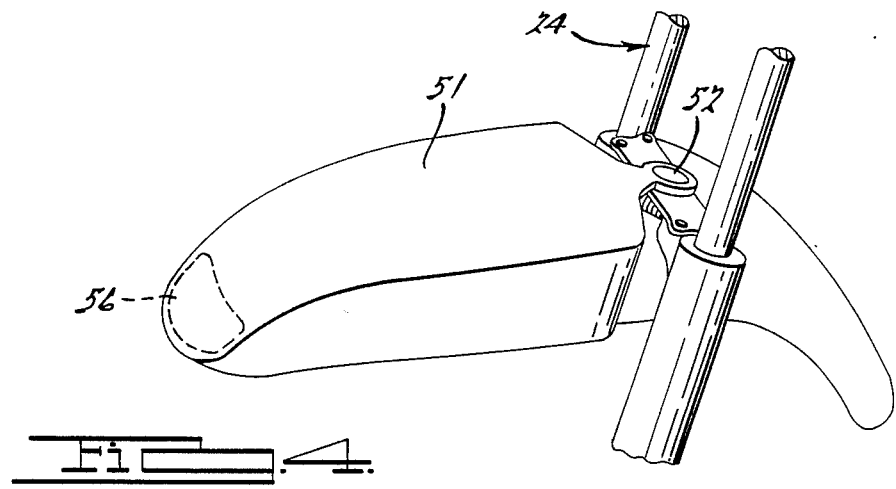
FIG. 4 is a perspective view showing another embodiment of the invention.

Referring first in detail to FIG. 1, a motorcycle having a steering system constructed in accordance with a first embodiment of the invention is identified generally by the reference numeral 21. Since the invention relates to the steering system of the motorcycle 21, only the front wheel and the portion of the motorcycle associated with the suspension and steering arrangement for the front wheel has been illustrated. The motorcycle 21 includes a frame assembly, indicated generally by the reference numeral 21 which is of the welded up tubular type and which has a head pipe 23. A front fork assembly, indicated generally by the reference numeral 24 is supported for steering movement about a steering axis, indicated by the line 25 which steering axis is defined by the head pipe 23. A handlebar assembly 26 is affixed to the upper end of the front fork 24 for controlling its steering.

A front wheel and tire 27 is rotatably journaled about a rotational axis 28 by the front fork 24 in a known manner. The construction of the motorcycle 21 as thus far described may be considered to be conventional and for that reason, further details of the construction are believed to be unnecessary in order to understand the construction and operation of the invention.

Referring now primarily to FIGS. 2 and 3, a front fender 29 is affixed in a suitable manner to the front fork 24 and at least in part overlies the front wheel 27. In this embodiment, the front fender 29 is provided with a cut away section 31 that is covered by a cowling part 32 that provides a continuation of the configuration of the front fender 29. Positioned within the cowling arrangement 32 is a steering damper mechanism, indicated generally by the reference numeral 33. The steering damper mechanism 33 includes a base plate 34. The base plate 34 is provided with lugs 35 that are formed with apertures 36 so as to facilitate attachment of the base plate 34 to the fender 29 within the recess 31 and beneath the cowling 32.

The base plate 34 has an upstanding flange 37 formed at one end thereof from which a rod 38 extends. The rod 38 has slidably supported upon it an inertial mass 39 which has a generally cylindrical configuration. The inertial mass 39 is supported on the rod 38 between a first coil spring 41 and a second coil spring 42. The coil spring 41 is disposed between the inertial mass 39 and the flange 37 while the spring 42 is disposed between the inertial mass 39 and a washer 43 that is fixed in an axial position on the rod 39 as determined by a nut 44. As a result, the tightness of the nut 44 on the rod 38 will change the precompression of the springs 41 and 42 so as to set the forces required for the inertial mass 39 to slide along the rod 38.

In this embodiment, the inertal mass 39 cooperates with the springs 41 and 42 so that it will normally rotate with the front wheel 27 during its steering movement but also so that some relative movement about the steering axis 25 is possible so as to dampen vibrations which might tend to cause shimmy. As a result, the device acts as a very effective shimmy damper with the effect being adjustable by changing the preload of the springs 41 and 42, their rate and the mass of the inertial mass 39.

Figure 5:
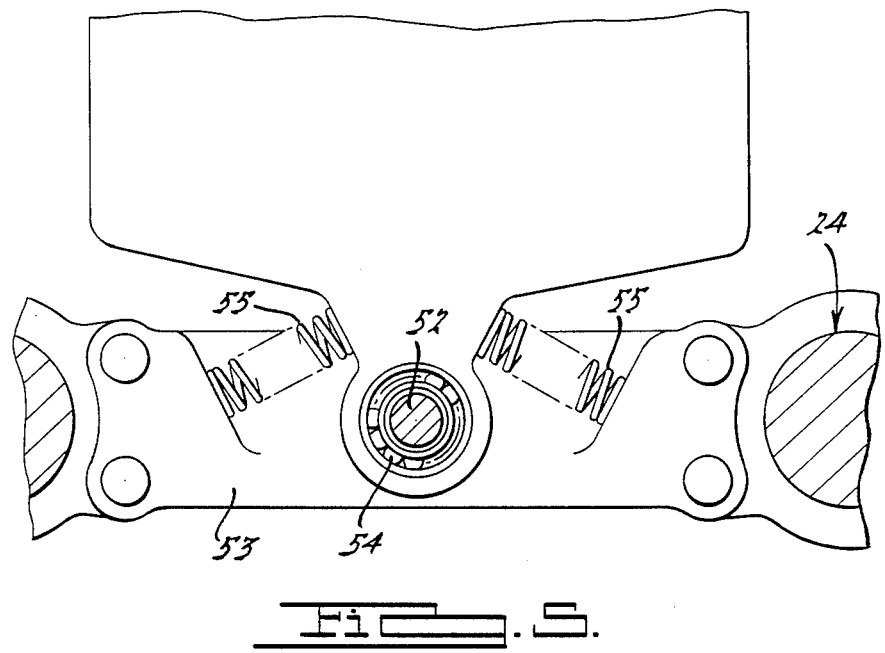
FIG. 5 is an enlarged cross-sectional view taken on a plane through the steering axis.

FIGS. 4 and 5 show another embodiment of the invention. In this embodiment, a front fender 51 is carried by the front fork assembly 24 in a manner so that the front fender may rotate slightly relative to the front fork assembly. To this end, the front fork assembly carries a central post 52 by means of a fixed cross piece 53. The front fender 51 is journaled upon the post 52 by means of a bearing 54. The fender 51 is normally held against relative rotation about the steering axis 25 and the axis of the post 52 by means of a pair of coil compression springs 55. The preload of the coil compression springs 55 may be adjusted in any suitable manner.

The forward portion of the front fender 51 is provided with an inertial mass 56, although it is to be understood that the mass of the fender itself may serve as the inertial damper in this embodiment. As a result, the fender 51 may rotate relative to the post 52 and steering axis 25 against the actions of the springs 55 so as to effect shimmy damping in this embodiment.

Figure 6:
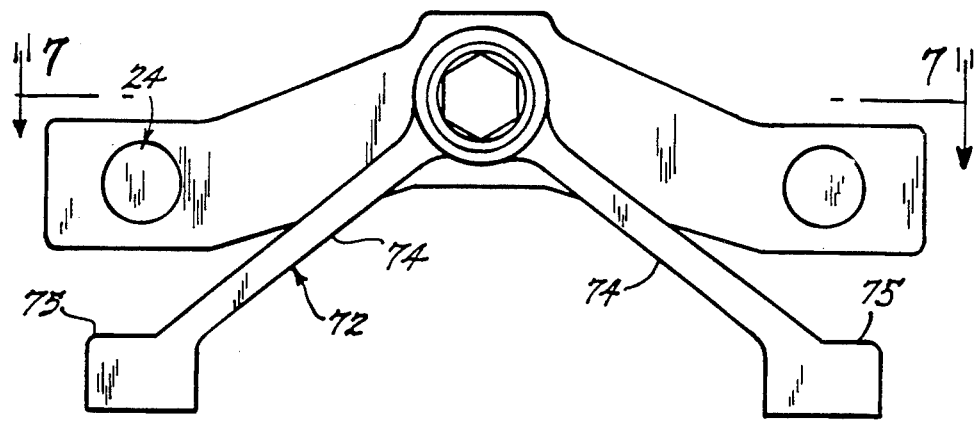
FIG. 6 is a top plan view showing another embodiment of the invention.
Figure 7:
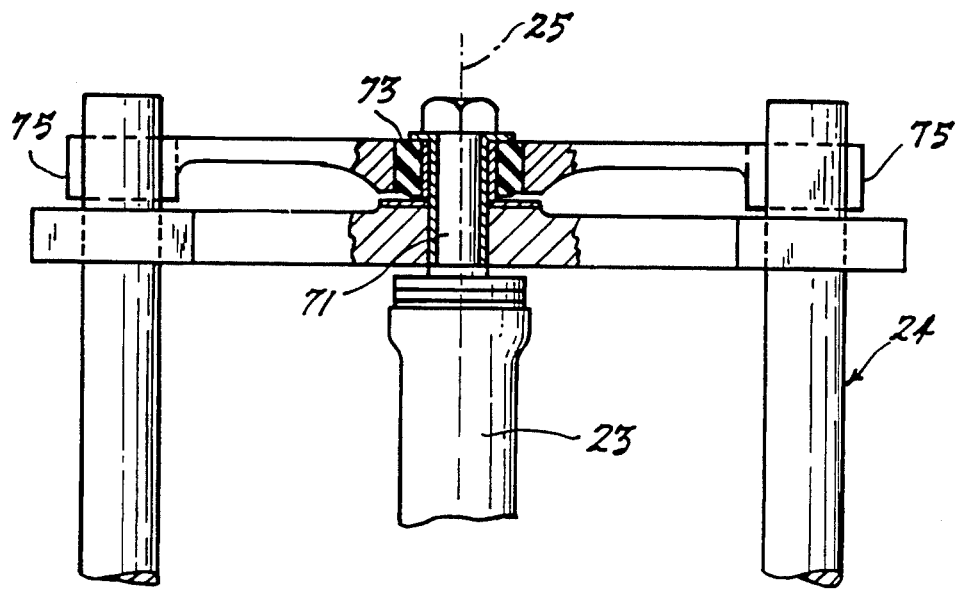
FIG. 7 is a cross-sectional view taken along the line 7—7 of FIG. 6.

Yet another embodiment of the invention is depicted in FIGS. 6 and 7. In this embodiment, the front fork 24 has a splined or keyed connection to a steering shaft 71 for its steering movement as with the previously described embodiments. A bell crank shaped inertial member 72 is rotatably connected to the steering shaft 71 and front fork 24 by means of an elastic coupling 73. The inertial member 72 has a pair of angularly disposed arms 74 each of which has an inertial mass 75 at its outer end. As a result, the inertial member 72 will rotate with the front fork 24 but it is also capable of some limited relative rotation about the steering axis 25 upon deflection of the elastomeric member 73 so as to provide shimmy damping.

A still further embodiment of the invention is shown in FIGS. 8 through 10 wherein the motorcycle is provided with a front fender 81 that is fixed in a suitable manner to the front fork 24. The front fender 81 includes an inertial mass 82 that is connected to the front fender 81 by means of a mounting plate 83 and a leaf type spring 84. The leaf spring 84 will permit the inertial mass 82 to swing slightly relative to the front fender 81 and achieve shimmy damping in a manner similar to the previously described embodiments.

FIGS. 11 and 12 show yet another embodiment of the invention wherein inertial members 101 are connected to side tube 102 of the front fork assembly 24 by means of leaf springs 103. The inertial members 101 normally rotate with the front fork assembly 24. However, if shimmy forces are encountered, the inertial members 101 may rotate relative to the front fork due to deflection of the leaf springs 103 and achieve shimmy damping.

FIGS. 13 and 14 show another embodiment of the invention. In this embodiment, inertial members 121 are affixed to the lower end of the front fork assembly 24 by means of leaf type springs 122. It should be noted that the orientation is such that the inertial members 121 may swing about the steering axis 25 relative to the front wheel 27 so as to absorb shimmy forces and also may swing in a fore and aft direction about the caster axis 123 so as to further assist in shimmy damping.

Figure 15:
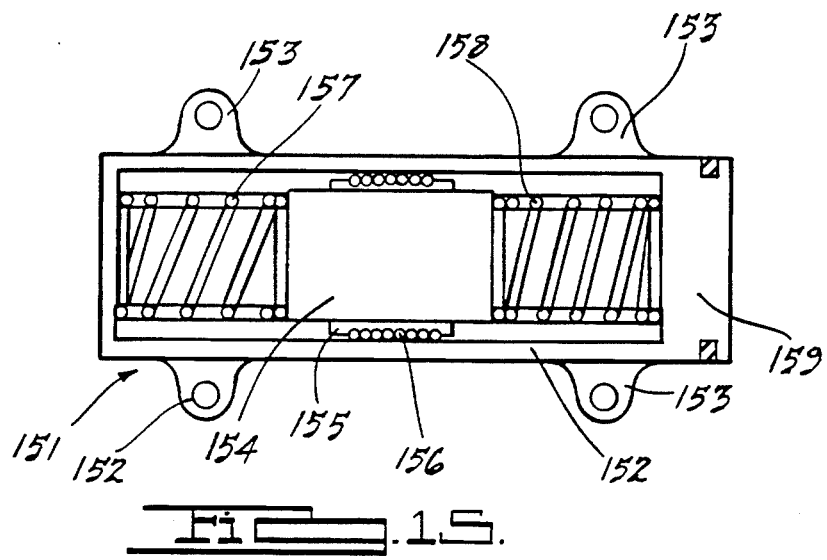
FIG. 15 is a cross-sectional view, in part similar to FIG. 3, showing a still further embodiment of the invention.

FIG. 15 shows a still further embodiment of the invention which is similar to the embodiment of FIGS. 1 through 3 but which produces a lighter weight construction. In this embodiment, a damper member is indicated generally by the reference numeral 151 and is adapted to be formed as a part of the front fender assembly in a manner similar to that shown in FIGS. 1 through 3. The damping member 151 includes a housing 152 having mounting lugs 153 that facilitate mounting to the front fender. The housing 152 defines an internal cavity in which an inertial member 154 is supported. The inertial member 154 carries a bearing carrier 155 at its outer periphery in which a plurality of antifriction bearings 156 are supported for slidable engagement with the internal cavity of the housing 152.

A first coil compression spring 157 is supported between the blind end of the housing member 152 and one end of the inertial member 154. A second coil spring 158 is received between the other end of the inertial member 154 and a detachable closure plug 159 that closes the housing cavity and preloads the springs 157 and 158. As a result, this embodiment will provide damping in a similar manner to the embodiment of FIGS. 1 through 3 but the weight of the supporting shaft is avoided.

Figure 16:
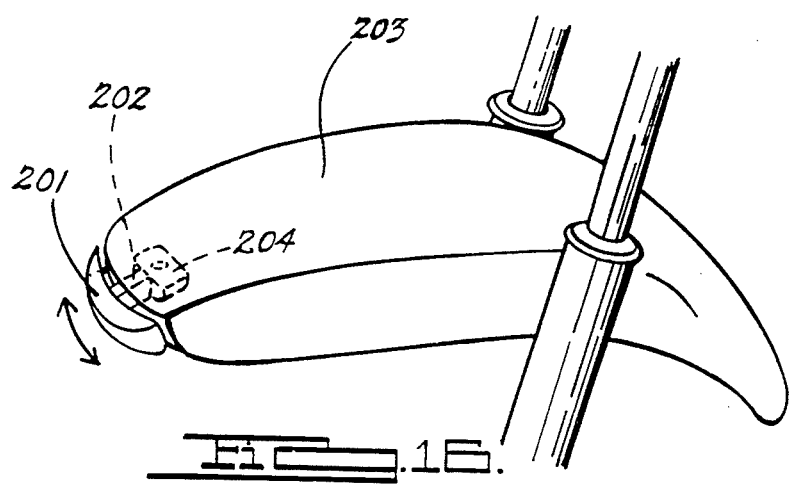
FIG. 16 is a partial, perspective view, in part similar to FIG. 4, showing yet another embodiment of the invention.

FIG. 16 shows a still further embodiment of the invention that is similar in principle to the embodiment of FIGS. 4 and 5 but which also provides a lighter weight construction. In this embodiment, an inertial member 201 is supported by a leaf spring or cantilever spring 202 at the forward end of the fender 203 on a mounting base 204. The mounting base 204 is affixed suitably to the fender 203 and the elasticity of the cantilever spring 202 permits the inertial member 201 to swing relative to the front fender 203 and associated front wheel so as to achieve shimmy damping as in the previously described embodiments.

It should be apparent from the foregoing description that a number of embodiments of the invention have been illustrated and described and each of which is highly effective in dampening shimmy forces. Although a number of embodiments of the invention have been illustrated and described, various changes and modifications may be made. For example, in all of the embodiments a spring arrangement such as coil springs, leaf springs or elastomeric members have been interposed between the inertial mass and the front wheel for dampening shimmy forces. It is to be understood that viscous couplings could also be used for this purpose. Other variations and modifications may be made without departing from the spirit and scope of the invention, as defined by the appended claims.

We claim:

1. A steering damping arrangement for a motorcycle comprising a frame, a front wheel, a front fork for supporting said wheel for steering movement about a steering axis relative to said frame, a front fender assembly carried by said front fork and being steerble therewith about said steering axis, said front fender assembly having a portion overlying said front wheel, an inertial mass and means for resiliently coupling said inertial mass directly to said front fender assembly for resilient movement relative to said front fender assembly and said front wheel about said steering axis for dampening shimmy forces.

2. A steering damping arrangement as set forth in claim 1, wherein the resilient coupling means comprises a spring.

3. A steering damping arrangement as set forth in claim 1 wherein the front fender assembly is moveable as a unit relative to the front wheel.

4. A steering damping arrangement as set forth in claim 1 wherein the inertial mass is supported at a front end of the fender assembly.

* * * * *